United States Patent
Zarem

(10) Patent No.: US 8,471,191 B2
(45) Date of Patent: Jun. 25, 2013

(54) OPTICAL NAVIGATION SYSTEM HAVING A FILTER-WINDOW TO SEAL AN ENCLOSURE THEREOF

(75) Inventor: Harold Zarem, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 846 days.

(21) Appl. No.: 11/303,365

(22) Filed: Dec. 16, 2005

(65) Prior Publication Data

US 2007/0138377 A1    Jun. 21, 2007

(51) Int. Cl.
*G09G 5/08* (2006.01)

(52) U.S. Cl.
USPC ............ 250/221; 250/216; 345/163; 345/166

(58) Field of Classification Search
USPC ............................ 250/216, 221; 345/163, 166
See application file for complete search history.

(56) References Cited

U.S. PATENT DOCUMENTS

| | | |
|---|---|---|
| 3,922,093 A | 11/1975 | Dandliker et al. |
| 4,546,347 A | 10/1985 | Kirsch |
| 4,799,055 A | 1/1989 | Nestler et al. |
| 5,288,993 A | 2/1994 | Bidiville et al. |
| 5,473,344 A | 12/1995 | Bacon et al. |
| 5,578,813 A | 11/1996 | Allen et al. |
| 5,644,139 A | 7/1997 | Allen et al. |
| 5,703,356 A | 12/1997 | Bidiville et al. |
| 5,729,008 A | 3/1998 | Blalock et al. |
| 5,729,009 A | 3/1998 | Dandliker et al. |
| 5,786,804 A | 7/1998 | Gordon |
| 5,825,044 A | 10/1998 | Allen et al. |
| 5,854,482 A | 12/1998 | Bidiville et al. |
| 5,907,152 A | 5/1999 | Dandliker et al. |
| 5,963,197 A | 10/1999 | Bacon et al. |
| 5,994,710 A | 11/1999 | Knee et al. |
| 6,031,218 A | 2/2000 | Plot et al. |
| 6,037,643 A | 3/2000 | Knee |
| 6,057,540 A | 5/2000 | Gordon et al. |
| 6,097,371 A | 8/2000 | Siddiqui et al. |
| 6,151,015 A | 11/2000 | Badyal et al. |
| 6,172,354 B1 | 1/2001 | Adan et al. |
| 6,201,572 B1 | 3/2001 | Chou |

(Continued)

FOREIGN PATENT DOCUMENTS

WO    2004059613 A    7/2004

OTHER PUBLICATIONS

USPTO Notice of Allowance for U.S. Appl. No. 11/271,039 dated Jun. 15, 2007; 7 pages.

(Continued)

*Primary Examiner* — Seung C Sohn

(57) ABSTRACT

An optical navigation system is provided to sense relative movement between the system and a surface. Generally, the system includes: (i) an illuminator having a light source to illuminate a portion of the surface; (ii) a detector to receive light reflected from the portion of the surface; and (iii) an enclosure enclosing the illuminator and the detector, the enclosure having a window covering the detector and through which light reflected from the portion of the surface is transmitted to the detector, the window being substantially transparent to at least one wavelength of light emitted by the light source. In certain embodiments, the window is a filter-window that is substantially non-transparent to light from other sources, such as ambient light, having shorter or longer wavelengths. Other embodiments are also described.

15 Claims, 3 Drawing Sheets

U.S. PATENT DOCUMENTS

| | | | |
|---|---|---|---|
| 6,225,617 B1 | 5/2001 | Dandliker et al. |
| 6,233,368 B1 | 5/2001 | Badyal et al. |
| 6,243,134 B1 | 6/2001 | Beiley |
| 6,281,881 B1 | 8/2001 | Siddiqui et al. |
| 6,281,882 B1 | 8/2001 | Gordon et al. |
| 6,326,950 B1 | 12/2001 | Liu |
| 6,330,057 B1 | 12/2001 | Lederer et al. |
| 6,351,257 B1 | 2/2002 | Liu |
| 6,396,479 B2 | 5/2002 | Gordon |
| 6,421,045 B1 | 7/2002 | Venkat et al. |
| 6,424,407 B1 | 7/2002 | Kinrot et al. |
| 6,433,780 B1 | 8/2002 | Gordon et al. |
| 6,452,683 B1 | 9/2002 | Kinrot et al. |
| 6,455,840 B1 | 9/2002 | Oliver et al. |
| 6,462,330 B1 | 10/2002 | Venkat et al. |
| 6,476,970 B1 | 11/2002 | Smith |
| 6,529,184 B1 | 3/2003 | Julienne |
| 6,585,158 B2 | 7/2003 | Norskog |
| 6,603,111 B2 | 8/2003 | Dietz et al. |
| 6,608,585 B2 | 8/2003 | Beitz |
| 6,621,483 B2 | 9/2003 | Wallace et al. |
| 6,657,184 B2 | 12/2003 | Anderson et al. |
| 6,664,948 B2 | 12/2003 | Crane et al. |
| 6,674,475 B1 | 1/2004 | Anderson |
| 6,677,929 B2 | 1/2004 | Gordon et al. |
| 6,703,599 B1 | 3/2004 | Casebolt et al. |
| 6,737,636 B2 | 5/2004 | Dietz et al. |
| 6,753,851 B2 | 6/2004 | Choi et al. |
| 6,774,351 B2 | 8/2004 | Black |
| 6,774,915 B2 | 8/2004 | Rensberger |
| 6,795,056 B2 | 9/2004 | Norskog et al. |
| 6,809,723 B2 | 10/2004 | Davis |
| 6,819,314 B2 | 11/2004 | Black |
| 6,823,077 B2 | 11/2004 | Dietz et al. |
| 7,119,323 B1 | 10/2006 | Brosnan et al. |
| 7,138,620 B2 | 11/2006 | Trisnadi et al. |
| 7,248,345 B2 | 7/2007 | Todoroff et al. |
| 7,250,893 B2 | 7/2007 | Todoroff et al. |
| 7,253,837 B2 | 8/2007 | Henderson et al. |
| 7,279,668 B2 | 10/2007 | Misek |
| 7,280,140 B2 | 10/2007 | Henderson |
| 7,443,427 B2 | 10/2008 | Takayanagi |
| 2002/0093487 A1* | 7/2002 | Rosenberg ............ 345/166 |
| 2005/0024624 A1* | 2/2005 | Gruhlke et al. ......... 356/3.01 |
| 2005/0186710 A1* | 8/2005 | Moyer et al. ........... 438/116 |
| 2005/0231482 A1* | 10/2005 | Theytaz et al. ......... 345/166 |
| 2005/0285960 A1 | 12/2005 | Purcell et al. |
| 2006/0028442 A1* | 2/2006 | Bynum et al. .......... 345/157 |
| 2011/0248153 A1 | 10/2011 | Zarem |

OTHER PUBLICATIONS

USPTO Final Rejection for U.S. Appl. No. 11/271,039 dated Mar. 16, 2007; 8 pages.

USPTO Non-Final Rejection for U.S. Appl. No. 11/271,039 dated Aug. 8, 2006; 1 page.

USPTO Notice of Allowance for U.S. Appl. No. 11/268,898 dated Apr. 19, 2007; 9 pages.

USPTO Notice of Allowance for U.S. Appl. No. 11/261,316 dated Aug. 23, 2006; 6 pages.

USPTO Non-Final Rejection for U.S. Appl. No. 11/261,316 dated Jun. 6, 2006; 6 pages.

Written Opinion of the International Searching Authority dated Feb. 22, 2008 for International Application No. PCT/US06/47723; 4 pages.

International Search Report of the International Searching Authority Feb. 22, 2008 for International Application No. PCT/US06/47723; 2 pages.

International Search Report and Written Opinion for Application No. PCT/US06/47723 dated Feb. 22, 2008; 3 pages.

USPTO Non-Final Rejection for U.S. Appl. No. 13/069,835 dated Jan. 5, 2012; 7 pages.

USPTO Notice of Allowance for U.S. Appl. No. 13/069,835 dated Jun. 21, 2012; 7 pages.

* cited by examiner

OPTICAL NAVIGATION SYSTEM HAVING A FILTER-WINDOW TO SEAL AN ENCLOSURE THEREOF

TECHNICAL FIELD

The present invention relates generally to motion sensors, and more particularly to optical navigation systems and methods of sensing movement using the same.

BACKGROUND OF THE INVENTION

Data input devices or finger navigation devices, such as computer mice, touch screens, trackballs, scroll wheels and the like, are well known for inputting data into and interfacing with personal computers or workstations. Such devices allow rapid relocation of a cursor on a monitor, and are useful in many text, database and graphical programs. A user controls the cursor, for example, by moving the mouse over a surface to move the cursor in a direction and over distance proportional to the movement of the mouse.

Computer mice, for example, come in both optical and mechanical versions. Mechanical mice typically use a rotating ball to detect motion, and a pair of shaft encoders in contact with the ball to produce a digital signal used by the computer to move the cursor. One problem with mechanical mice is that they are prone to inaccuracy and malfunction after sustained use due to dirt accumulation, etc. In particular, mechanical mice have not demonstrated the accuracy demanded in state-of-the-art mice today, which generally must have a path error of less than 0.5%. In addition, the movement and resultant wear of the mechanical elements, particularly the shaft encoders, necessarily limit the useful life of the device.

One solution to the above problems with mechanical mice has been the development of mice using an optical navigation system. These optical mice have become very popular because they provide a better pointing accuracy and are less susceptible to malfunction due to accumulation of dirt.

The dominant technology used today for optical mice relies on a light emitting diode (LED) illuminating a surface at or near grazing incidence, a two-dimensional CMOS (complimentary metal-oxide-semiconductor) detector which captures the resultant images, and software that correlates successive images to determine the direction, distance and speed the mouse has been moved. This technology provides high accuracy but suffers from a complex design and relatively high image processing requirements.

Another approach uses one-dimensional arrays of photo-sensors or detectors, such as photodiodes (PDs), and a coherent light source, such as a laser. Light from the coherent source scattered off of an optically rough surface generates a random intensity distribution of light known as speckle. Successive images of the surface are captured by imaging optics, translated onto the photodiodes, and compared to detect movement of the mouse. The photodiodes may be directly wired in groups to facilitate motion detection. This reduces the photodiode requirements, and enables rapid analog processing. The use of a speckle-based pattern has several advantages, including efficient laser-based light generation and high contrast images even under illumination at normal incidence. This allows for a more efficient system and conserves current consumption, which is very important in wireless applications.

Although a significant improvement over prior LED/CMOS-based optical mice, these speckle-based devices have not been wholly satisfactory for a number of reasons. In particular, conventional optical mice include one or more openings in an enclosure enclosing the device through which light is emitted and transmitted to the photo-sensors or detectors. By opening it is meant there is substantially no barrier or screen between illumination and imaging optics or lens, or between the light source and photo-sensors. Thus, these openings render the optical navigation system susceptible to the penetration of dust and other foreign objects, which interfere with operation of the device.

Another type of finger navigation device is a touch pad which detects movement of a stylus or finger over a surface of the pad. Generally, conventional touch pads rely on small changes in capacitance or resistance to sense movement across the pad surface. One problem with this approach is that the touch pads are prone to inaccuracy and malfunction after sustained use due to dirt accumulation and deforming of the pad surface. Thus, it would be desirable to have an optical or light-based touch pad. However, this has not been possible heretofore due to interference from ambient light in the environment.

Accordingly, there is a need for an optical navigation system that has a low path error, and is less susceptible to the penetration of dust and other foreign objects. It is further desirable that the optical navigation system is substantially invulnerable to interference from ambient light in the environment.

The present invention provides a solution to these and other problems, and offers further advantages over conventional optical navigation systems.

BRIEF DESCRIPTION OF THE DRAWINGS

These and various other features and advantages of the present invention can be understood more fully from the detailed description that follows and from the accompanying drawings, which however, should not be taken to limit the appended claims to the specific embodiments shown, but are for explanation and understanding only, where:

DETAILED DESCRIPTION

The present invention relates generally to optical navigation systems, and more particularly to an optical navigation system having an enclosure with a filter-window to seal an opening(s) for light emission and/or collection, thereby increasing the robustness and illumination or optical efficiency of the system.

The optical navigation system described herein is particularly suitable for use with a finger navigation device, such as an optical computer mouse, a trackball, an optical touch pad and a scroll wheel or bar to sense relative movement between an optical sensor and a surface relative to which it is moved.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail or are shown in block diagram form only in order to avoid unnecessarily obscuring an understanding of this description.

Reference in the description to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Briefly, a finger navigation device having an optical navigation system according to the present invention includes an enclosure having a window that is substantially transparent to a wavelength or wavelengths of light used by the optical navigation system, and therefore does not require an opening in the enclosure for collection and/or emission of light. In certain preferred embodiments, described in greater detail below, the window is a filter-window that is substantially non-transparent to wavelengths of light other than those used by the optical navigation system.

Figure 1:
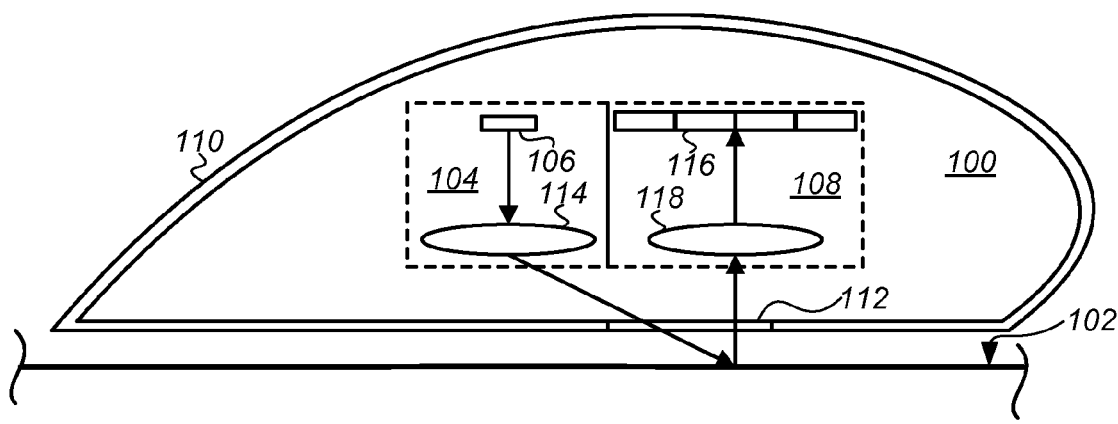
FIG. 1 is a functional block diagram of an optical computer mouse having an enclosure with a filter-window according to an embodiment of the present invention.
Figure 6:
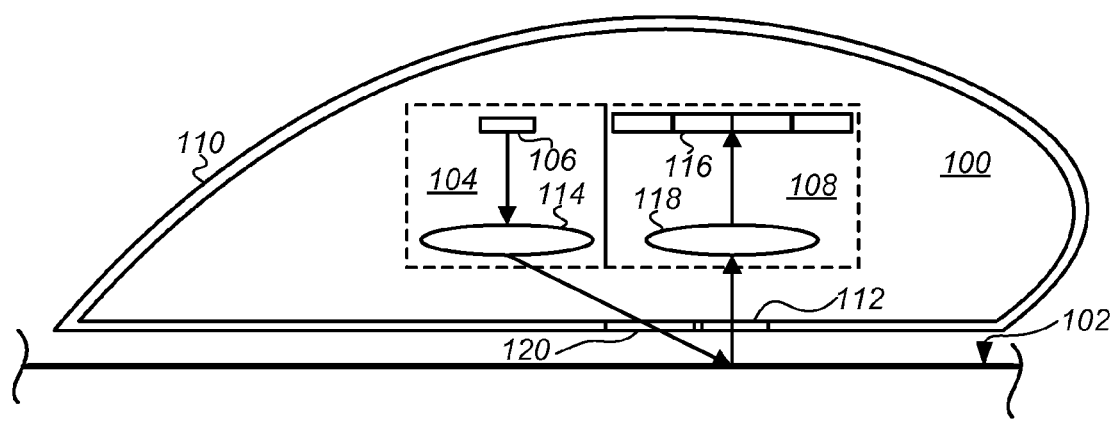
FIG. 6 is a functional block diagram of an optical computer mouse having an enclosure with a separate, second window covering the light source according to another embodiment of the present invention.

In one embodiment, shown in FIG. 1, the finger navigation device is an optical computer mouse 100 for sensing relative movement between the mouse and a surface 102. Preferably, the surface is an optically rough or non-speculator surface characterized by topological surface irregularities or a roughness at least as great as the wavelength of light used by the optical navigation system. Referring to FIG. 1, the optical computer mouse 100 includes an illuminator 104 having a light source 106 to illuminate a portion of the surface 102, a detector 108 to receive light reflected from the portion of the surface, and an enclosure 110 enclosing the illuminator and detector with a window 112 therein. That is the window 112 of the enclosure 110 covers at least the detector 108 and transmits light reflected from the surface 102 onto a photosensitive surface or elements thereof Preferably, the window 112 is sized, shaped and located to also cover the illuminator 104 or light source 106, as shown in FIG. 1, so that both light emitted from the enclosure 110 and light reflected from the surface 102 is transmitted through the window. Alternatively, as shown in FIG. 6 the enclosure 110 can include a separate, second window or filter-window 120 through which light emitted from the light source 106 is transmitted to illuminate a portion of the surface 102. In yet another alternative, the enclosure 110 can simply include an opening (not shown), such as an opening, through which light emitted from the light source 106 is transmitted to the surface 102.

In the embodiment of FIG. 1 the illuminator 104 further includes illumination optics 114 to focus or concentrate light from the light source 106 onto the portion of the surface 102. The detector can include a number of photosensitive elements 116, such as photodiodes, to receive light reflected from the surface 102, and imaging optics 118 to focus reflected light from the portion of the surface onto the photosensitive elements.

Preferably, the illumination optics 114, imaging optics 118 and window 112 are adapted to minimize reflections from the window of light striking the window at normal or near normal incidence, thereby increasing the optical efficiency of the device 100.

More preferably, the light source 106 is a narrow-band light source, such as a light emitting diode (LED), emitting light having only a narrow range of wavelengths or a coherent light source emitting a single wavelength. In these embodiments, the window 112 is a filter-window that is substantially transparent to at least some of the wavelengths of light emitted by the light source 106, but is substantially non-transparent to ambient or environmental light expected to be found in the normal operating environment of the mouse 100. Most preferably, the filter-window 112 is substantially transparent to a wavelength or wavelengths of the light source 106, but is substantially non-transparent to light having shorter or longer wavelengths. For example, in one embodiment the filter-window 112 can be substantially transparent to Infra-red (IR) light emanating from the light source 106, but substantially non-transparent to light having shorter wavelengths, such as visible light.

In another embodiment, the finger navigation device can include a speckle-based optical navigation system having a coherent light source. Speckle-based optical navigation systems use light from a coherent light source, such as a laser, scattered off of an optically rough or irregular surface to generate a random intensity distribution of light known as speckle. In general, any surface with topological irregularities greater than the wavelength of light (i.e. roughly>1 mm) will tend to scatter light into a complete hemisphere in approximately a Lambertian fashion. If a coherent light source is used, the spatially coherent, scattered light will create a complex interference pattern upon detection by a square-law detector with finite aperture. This complex interference pattern of light and dark areas is termed speckle. The exact nature and contrast of the speckle pattern depends on the surface roughness, the wavelength of light and its degree of spatial-coherence, and the light-gathering or imaging optics. Although often highly complex, a speckle pattern is distinctly characteristic of a section of any surface that is imaged by the optics and, as such, can be employed to identify a location on the surface as it is displaced transversely to the laser and optics-detector assembly.

The use of a speckle-based optical navigation system has several advantages, including efficient laser-based light generation and high contrast images even under illumination at normal incidence. This allows for a more efficient operation and conserves power consumption, which is very important in wireless applications.

A filter-window that is substantially non-transparent to wavelengths of light other than that of the coherent light source is particularly suitable for use with speckle-based optical navigation systems. In addition, the filter-window can be further adapted to improve a signal quality in the speckle-based optical navigation system by filtering the light passing therethrough. That is the filter-window adapted to improve a signal quality by filtering background light, such as environmental or ambient light in the visible spectrum, which would otherwise appear as noise to the optical navigation system. The filter-window also reduces the dynamic range requirements of the optical navigation system, and in particular of the imaging optics and the photosensitive elements. Alternatively, the window or filter-window can be selected to be substantially transparent to a number of wavelengths of light in addition to that of the coherent light source, and the detector or photosensitive elements thereof can be selected to be insensitive to wavelengths of light other than that originating from the light source. In particular, the detector or photosensitive elements can be selected to be insensitive to ambient or environmental light which may enter through the window or enclosure during in operation of the finger navigation device.

Figure 2:
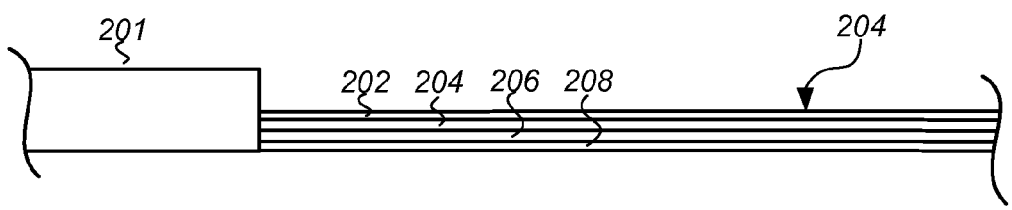
FIG. 2 is cross-sectional side view of a portion of a window according to an embodiment of the present invention.

A cross-sectional side view of a portion of a window 200 in an enclosure 201 is shown in FIG. 2. Referring to FIG. 2, the window 200 can include one or more layers 202, 204, 206, 208, of plastic, glassine or crystalline materials that are substantially transparent to at least one wavelength of light, which can be emitted by the light source and sensed by the detector. An important criteria of the window 200 is its' transmittance in a selected band or frequencies. As used herein transmittance is a ratio of the transmitted light to the incident light, usually expressed as a percentage. Alternatively, the window material can be chosen based on an optical density to a particular frequency or a selected band or frequencies. In addition, the window 200 should be of a good optical quality so that it does not disperse light passing therethrough. Outer and/or inner layers of the window 202, 208, can be selected for physical or optical properties, such as abrasion resistance, strength and/or low reflection. Low reflection may be achieved through the use of an additional anti-reflective coatings (ARC) or layers. (Not shown in this figure).

Preferably, the window 200 is a filter-window, including at least one layer having a thickness and absorbent dopant or tint or shading that is selected to block at least one wavelength of light. More preferably, the window 200 is substantially transparent to all wavelengths of light in the IR with wavelengths of at least about 700 nm, while attenuating or substantially blocking all light having wavelengths below 700 nm or above 0.01 cm. Most preferably, the window 200 has a high IR transmittance of at least about 85% at wavelengths of about 700 nm or greater and window thicknesses of between about 0.01 to 5 mm and preferably between about 0.01 to 1 mm. Suitable window material can include, for example, POLY-IR® commercially available from Fresnel Technologies, Inc., of Fort Worth, Tex. Such a filter-window is particularly suitable for a finger navigation device with a speckle-based optical navigation system having a Vertical Cavity Surface Emitting Laser (VCSEL) as a coherent light source. VCSELs operate at wavelengths of from about 750 nm to about 950 nm, and more typically at a wavelength of 850 nm.

Figure 3:
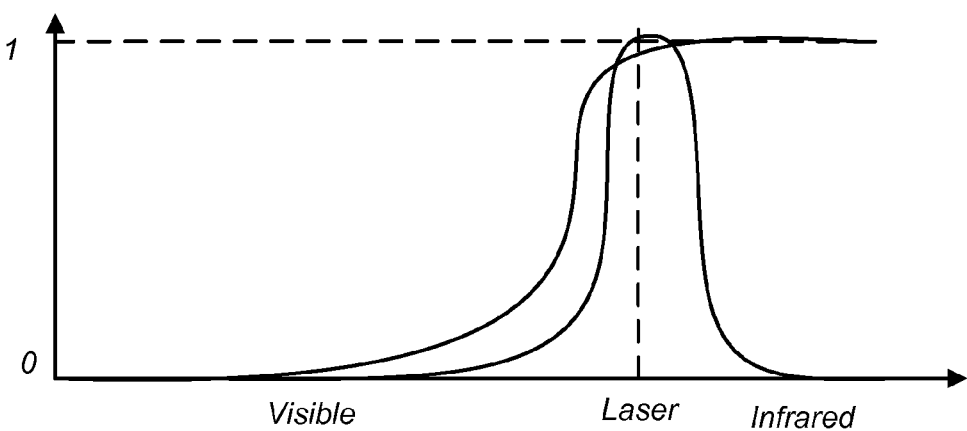
FIG. 3 shows graphs illustrating transmission properties of a bandpass and a notch filter-window according to embodiments of the present invention.

In one embodiment the filter-window 200 has at least two filtering windows or layers 204, 206, including a first filter-window to block light having wavelengths shorter than the wavelength of the light source, and a second filter-window to block light having wavelengths longer than the wavelength of the light source. In another example, the first filter-window 204 can include a bandpass filter-window, while the second filter-window 206 includes a notch filter-window. Graphs showing transmission properties of a bandpass filter-window or layer and a notch filter window or layer are shown in FIG. 3. Referring to FIG. 3, curve 302 shows the transmission properties of a bandpass filter-window or layer, and curve 304 shows the transmission properties of a notch filter window or layer.

Figure 4:
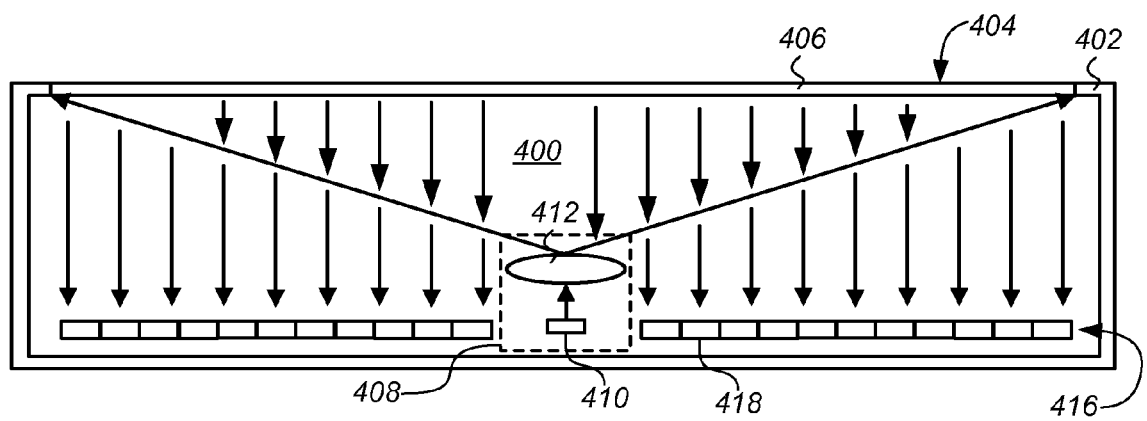
FIG. 4 is a functional block diagram of an optical touch pad having a pad surface with a filter-window according to an embodiment of the present invention.

In another embodiment, shown in FIG. 4, the finger navigation device is an optical touch pad 400 having an enclosure 402 with a pad surface 404 including a window 406, to enable optical sensing of movement of a stylus or finger (not shown) across the pad surface. Referring to FIG. 4, the optical touch pad 400 generally includes at least one illuminator 408 within the enclosure 402 and having a light source 410 and illumination optics 412 to illuminate at least a portion of the window 406, and through the window at least a portion of the operators finger or a stylus when positioned in contact with or proximal to the surface thereof The optical touch pad 400 further includes a detector including an array or arrays 416 of one or more photosensitive elements 418 within the enclosure 402, which receive light reflected through the window 406 from the stylus or finger to sense the movement thereof. As with the optical mouse 100 described above, the window 406 is substantially transparent to wavelengths of emitted from the light source 410 and reflected from the finger or stylus.

Preferably, the window 406 is a filter-window that is substantially non-transparent to other wavelengths of light, such as ambient or environmental light. Alternatively, or in addition the detector arrays 416 can be insensitive to wavelengths of light other than that of the light source 410 which may fall thereon through the window 406 in operation of the optical touch pad 400. More preferably, the optical touch pad 400 includes a speckle-based optical navigation system, and the filter-window 406 is adapted to improve a signal quality in the speckle-based system.

Figure 5:
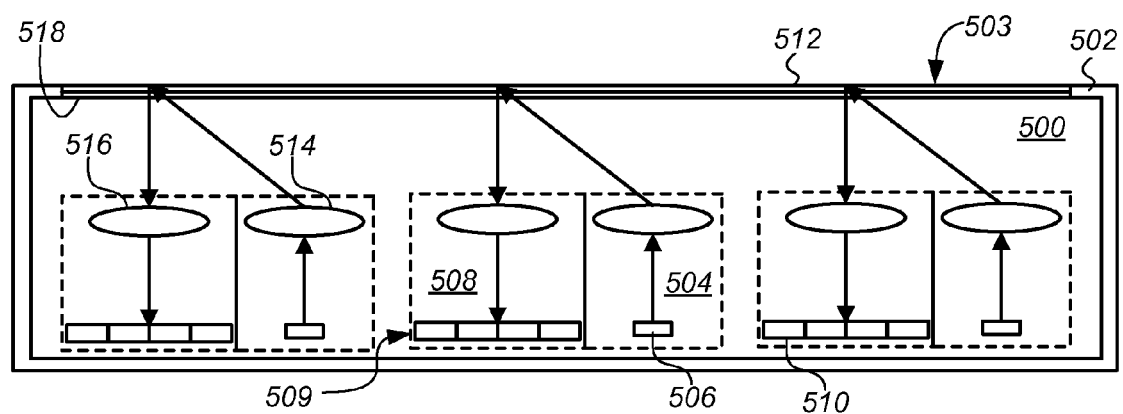
FIG. 5 is a functional block diagram of an optical touch pad having a pad surface with a filter-window and multiple illuminators and detectors according to another embodiment of the present invention.

In another embodiment, shown in FIG. 5, optical touch pad 500 can include within a single enclosure 502 with a pad surface 503 and multiple illuminators 504, each having a light source 506, and multiple detectors 508, each with an array 509 of a number of photosensitive elements 510, to receive reflected light through the window 512 at normal or near normal incidence. Generally, the illuminators 504 further include illumination optics 514 to focus or concentrate light from the light sources 506 onto the window 512, and the detectors further include imaging optics 516 to focus reflected light onto the photosensitive elements 510.

Preferably, as with the optical mouse 100 described above, the window 512 has one or more layers of plastic, glassine or crystalline materials that are substantially transparent to at least one wavelength of light emitted by the light source(s) 506, and which can be selected for physical or optical properties, such as abrasion resistance, strength, low refraction or low reflection.

In the embodiment shown, the window 512 further comprises an inner anti-reflective layer 518 to reduce reflection of light from the light source 506. More preferably, the window 512 is a filter-window, and includes at least one layer that is doped, tinted or shaded to block at least at least one wavelength of light while transmitting substantially unimpeded at least one wavelength of light emitted by the light source(s) 506.

Although described above in detail with reference to an optical mouse and an optical touch pad, it will be appreciated that an optical navigation system including an enclosure having a window or filter-window can be used in other finger pointing devices without departing from the spirit and scope of the present invention. For example, the finger pointing device can be a track ball having a ball movably mounted or suspended proximal to the window or filter-window. Movement of the balls is detected through a speckle pattern in light reflected from a surface of the ball. Alternatively, the finger pointing device can be a scroll wheel having a wheel movably mounted or suspended proximal to the window of an optical navigation system according to the present invention to detect rotation of the wheel. The finger pointing device can also be a scroll pad or bar similar to the optical touch pad, but having a window and a detector array sized and shaped to detect motion only along a single axis or direction. It will further be appreciated that the scroll wheel and scroll bar can be combined with the optical mouse described above to facilitate rapid movement along a single axis.

The advantages of an optical navigation system including an enclosure having the filter-window over previous or conventional approaches include: (i) that an optical navigation system with the system is less susceptible to the penetration of dust and other foreign matter; (ii) that the system is substantially immune to interference from ambient light in the environment; and (iii) the unbroken enclosure improves the aesthetics of an optical navigation system with the system.

The foregoing description of specific embodiments and examples of the invention have been presented for the purpose of illustration and description, and although the invention has been described and illustrated by certain of the preceding examples, it is not to be construed as being limited thereby. They are not intended to be exhaustive or to limit the invention to the precise forms disclosed, and many modifications, improvements and variations within the scope of the invention are possible in light of the above teaching. It is intended that the scope of the invention encompass the generic area as herein disclosed, and by the claims appended hereto and their equivalents.

What is claimed is:

1. An optical navigation system for sensing relative movement between the system and a surface, the system comprising:
    an illuminator having a coherent light source having a single wavelength to illuminate a portion of the surface;
    a detector to receive light reflected from the portion of the surface, the detector including a speckle-based sensor configured to sense movement based on changes in a complex interference pattern created by the light reflected from the portion of the surface;
    an enclosure enclosing the illuminator and the detector, the enclosure having a filter-window covering the detector and through which light reflected from the portion of the surface is transmitted to the detector, the window being substantially transparent to at least one wavelength of light emitted by the light source; and
    wherein the filter-window comprises multiple layers including at least two filtering layers including a first filter-window to block light having wavelengths shorter than the wavelength of the light source, and a second filter-window to block light having wavelengths longer than the wavelength of the light source.

2. An optical navigation system according to claim 1, wherein the filter-window is substantially non-transparent to ambient light.

3. An optical navigation system according to claim 1, wherein the filter-window is substantially transparent to Infra-red (IR) light, but is substantially non-transparent to light having shorter wavelengths.

4. An optical navigation system according to claim 1, wherein the filter-window also covers the light source so that light emitted from the light source is transmitted out of the enclosure through the window.

5. An optical navigation system according to claim 4, wherein the filter-window covers substantially an entire lower surface of the enclosure.

6. An optical navigation system according to claim 1, further comprising a separate, second window covering the light source so that light emitted from the light source is transmitted out of the enclosure through the second window.

7. An optical navigation system according to claim 1, wherein the filter-window further comprises an anti-reflective layer to reduce reflection of light reflected from the portion of the surface.

8. A method of sensing movement of an optical navigation system relative to a surface, the method comprising steps of:
    illuminating a portion of the surface using an illuminator having a coherent light source with a single wavelength enclosed within an enclosure;
    transmitting light reflected from the portion of the surface to a detector enclosed within the enclosure through a window in the enclosure covering the detector, the detector including a speckle-based sensor configured to sense movement based on changes in a complex interference pattern created by the light reflected from the portion of the surface;
    detecting movement of the optical navigation system relative to the surface based on changes in the complex interference pattern created by the light reflected from the portion of the surface; and
    wherein the window comprises multiple layers including at least two filtering layers substantially non-transparent to light having wavelengths other than a wavelength of the coherent light source, and the step of transmitting light through the window includes the step of attenuating light having wavelengths other than the wavelength of the light source.

9. A method according to claim 8, wherein the window also covers the light source, and wherein the step of illuminating a portion of the surface comprises the step of transmitting light emitted from the light source out of the enclosure through the window.

10. A method according to claim 8, wherein the window further comprises an anti-reflective layer to reduce reflection of light reflected from the portion of the surface.

11. A method according to claim 8, wherein the window further comprises an inner anti-reflective layer to reduce reflection of light from the coherent light source.

12. A finger navigation device for sensing movement of a finger across a surface of the device, the finger navigation device comprising:
    an enclosure having a window that includes the surface across which the finger is moved;
    an illuminator enclosed within the enclosure and having a coherent light source with a single wavelength to illuminate at least a portion of the finger through the window when the portion of the finger is positioned in contact with or proximal to the surface of the window;
    a detector to receive light reflected from the portion of the finger through the window, the detector including a speckle-based sensor configured to sense movement based on changes in a complex interference pattern created by the light reflected from the portion of the finger; and
    wherein the window comprises multiple layers including at least two filtering layers substantially non-transparent to light having wavelengths other than a wavelength of light emitted from the light source.

13. A finger navigation device according to claim 12, wherein the window further comprises an inner anti-reflective layer to reduce reflection of light from the coherent light source.

14. A finger navigation device according to claim 12, wherein the speckle-based sensor comprises an array of photosensitive elements to sense movement based on changes in a complex interference pattern created by the light reflected from the portion of the surface.

15. A finger navigation device according to claim 12, wherein the speckle-based sensor comprises multiple arrays of photosensitive elements to sense movement based on changes in a complex interference pattern created by the light reflected from the portion of the surface, and wherein the illuminator comprises multiple coherent light sources, each light source associated with an array of photosensitive elements.

* * * * *